United States Patent
Patiejunas

(10) Patent No.: US 7,720,973 B2
(45) Date of Patent: May 18, 2010

(54) MESSAGE-BASED SCALABLE DATA TRANSPORT PROTOCOL

(75) Inventor: Kestutis Patiejunas, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1563 days.

(21) Appl. No.: 10/608,191

(22) Filed: Jun. 30, 2003

(65) Prior Publication Data

US 2004/0267934 A1    Dec. 30, 2004

(51) Int. Cl.
G06F 15/16    (2006.01)
(52) U.S. Cl. .................... 709/227; 709/203; 709/230
(58) Field of Classification Search ............... 709/203, 709/227, 230
See application file for complete search history.

(56) References Cited

U.S. PATENT DOCUMENTS

| | | | |
|---|---|---|---|
| 6,223,207 B1 * | 4/2001 | Lucovsky et al. ........... | 718/102 |
| 6,298,386 B1 | 10/2001 | Vahalia | |
| 6,430,607 B1 * | 8/2002 | Kavner ...................... | 709/217 |
| 6,611,879 B1 | 8/2003 | Dobecki | |
| 6,662,213 B1 | 12/2003 | Xie | |
| 6,857,053 B2 * | 2/2005 | Bolik et al. ................. | 711/162 |
| 6,978,464 B1 | 12/2005 | McDonald | |
| 7,065,620 B2 | 6/2006 | Ballard | |
| 7,219,346 B2 * | 5/2007 | Patiejunas ................... | 709/223 |
| 7,305,486 B2 * | 12/2007 | Ghose et al. ................ | 709/230 |
| 7,346,699 B1 | 3/2008 | Krause | |
| 7,433,955 B2 * | 10/2008 | Block et al. ................. | 709/227 |
| 2003/0031172 A1 | 2/2003 | Grinfeld | |
| 2003/0079121 A1 * | 4/2003 | Gilman et al. .............. | 713/153 |
| 2004/0267934 A1 * | 12/2004 | Patiejunas ................... | 709/227 |
| 2004/0267935 A1 * | 12/2004 | Patiejunas ................... | 709/227 |

OTHER PUBLICATIONS

European Search Report mailed Oct. 20, 2004 for Application No. EP04102523.0.

* cited by examiner

Primary Examiner—Ramy M Osman
(74) Attorney, Agent, or Firm—Shook, Hardy & Bacon, LLP

(57) ABSTRACT

The invention deploys a message-based data transport platform, in which a communication engine controls the delivery of server or other backup data or other large quantity data to a remote site based on message objects as fundamental units. Data sessions from one or more servers or other data sources may be buffered over established pipes for delivery to a remote data host which likewise contains messaging control. Relatively large message units may wait for communication over the channel in a queue, and be released when prior messaging is complete. Completion port or other polling or other mechanisms may indicate that connections have become open for use. In embodiments the message objects may be signed, or encrypted to safeguard against alteration or unauthorized viewing. The communication engine may rely upon TCP or other underlying transport mechanisms to effect lower level transmission.

16 Claims, 4 Drawing Sheets

MESSAGE-BASED SCALABLE DATA TRANSPORT PROTOCOL

CROSS-REFERENCE TO RELATED APPLICATION

The subject matter of this application is related to the subject matter of U.S. patent application Ser. No. 10/608,192 entitled "SYSTEM AND METHOD FOR MESSAGE-BASED SCALABLE DATA TRANSPORT", filed of even date with this application, having the same inventor as this application, assigned or under obligation of assignment to the same entity as this application, and which application is incorporated by reference herein.

STATEMENT REGARDING FEDERALLY SPONSORED RESEARCH OR DEVELOPMENT

Not applicable.

FIELD OF THE INVENTION

The invention relates to the field of information technology, and more particularly to a protocol designed to initiate and process large-scale network and other data backups or transfers via efficient message-based sessions.

BACKGROUND OF THE INVENTION

The increased demand for data enterprise and other storage solutions has fueled corresponding demand in data backup and management tools. Companies, government and scientific organizations and others may require the reliable backup of gigabytes or terabytes of data, or more for archival and other purposes. While physical storage media such as storage area networks, optical storage media, redundant arrays of inexpensive disk (RAID) and other platforms have increased the total archival capacity available to data managers, the ability to efficiently harvest large data backups to host facilities has not always similarly progressed.

For instance, a network administrator may periodically wish to extract the data updates stored to network storage, such as server drives on a local area network (LAN), and transport that data to a secure backup repository at a remote site. However, scheduling and executing that type of large-scale data transport is not always efficient using current technology. For instance, in the case of storing LAN data to a remote site, the administrator may attempt to move that quantity of data using a conventional network protocol, such as the Transfer Control Protocol (TCP).

However, TCP as one transport solution may prove to be a difficult vehicle to communicate the data backup to the remote host, in part because TCP tends to decompose data into comparatively small packets, on the order of a few tens of bytes to a few thousands of bytes. When attempting to drive gigabytes of original or update data to a remote host, that scale will not suffice for efficient transport. Moreover, when performing data flow control on the channel, TCP may pause to seek available bandwidth or capacity on the channel as small as a few thousand bytes, stop and fill that available space in the pipe, and then wait for additional open slots. Again, pushing data on the order of megabytes, gigabytes or more through an intermittent channel at those scales is not efficient when using the granularity of TCP API. Better large-scale and other data backup technologies are desirable. Other problems exist.

SUMMARY OF THE INVENTION

The invention overcoming these and other problems in the art relates in one regard to a system and method for message-based scalable data transport, in which one or more individual servers or other nodes communicate data backups and other information to a remote storage host via a communication engine. In embodiments, the communication engine may interface to an underlying transport layer, such as TCP or other protocols, and mediate the data flow from the nodes to the remote store. The communication engine may decompose the data awaiting transport into a set of message objects which are buffered out over connections bundled into established data pipes. The encapsulation of the data into fundamental message objects permits more continuous delivery of the data payload, since the messaging continues as long as the connection is not occupied and is clear, in contrast for instance to pure TCP transport which may exhibit stop-and-go or "chatter" type behavior. In embodiments, one originating session may transmit data over more than one connection, to maximize channel utilization. The communication engine may perform traffic control based on the polling of completion ports to indicate message completion, or other channel mechanisms, but in general not requiring acknowledgment of individual packets or other comparatively smaller data objects. High throughput through the inventive platform and protocol may be achieved.

DETAILED DESCRIPTION OF EMBODIMENTS

Figure 1:
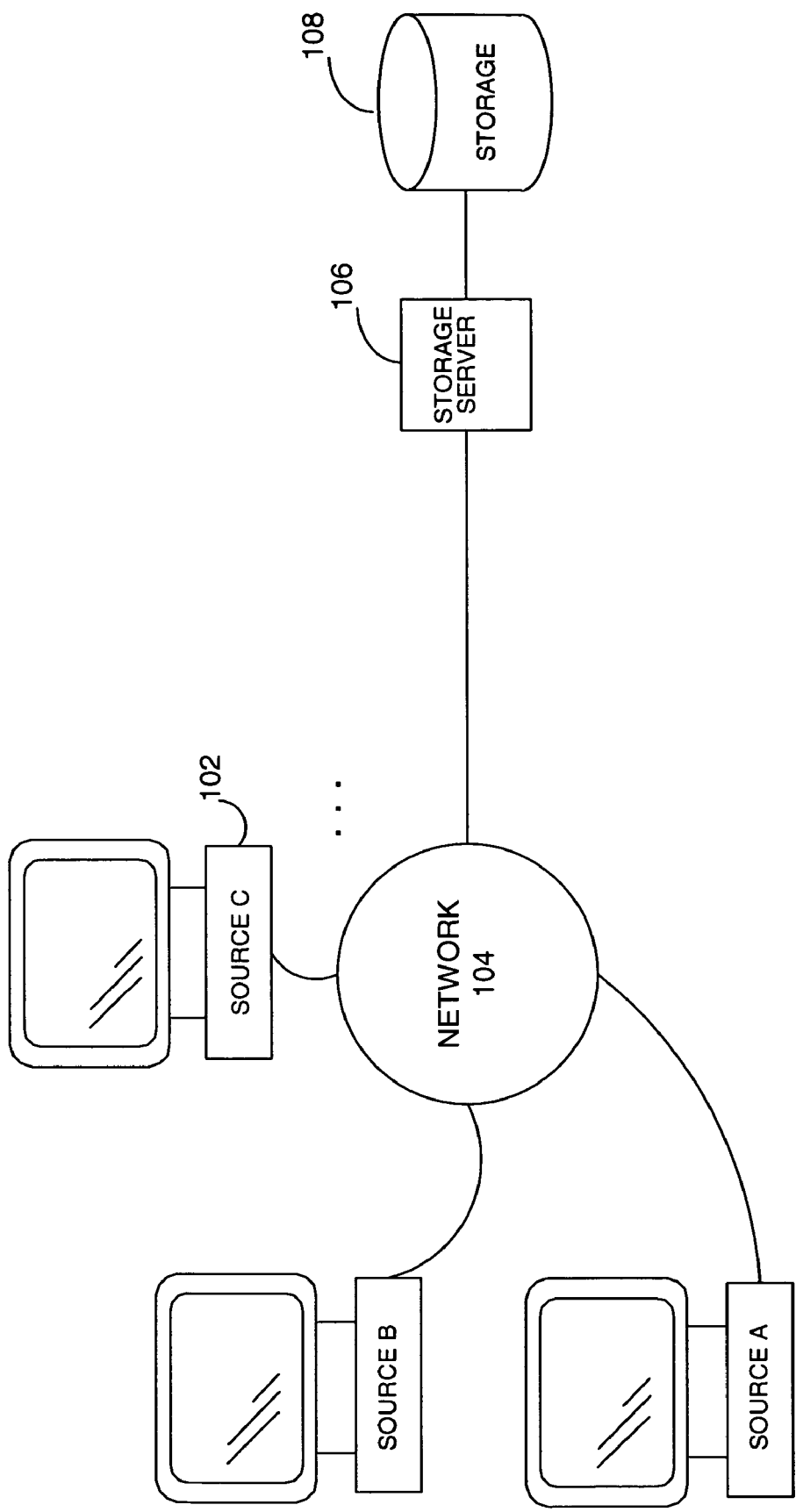
FIG. 1 illustrates an illustration of an overall network arrangement for processing data backups or other transfers, according to an embodiment of the invention.

FIG. 1 illustrates an architecture in which a system and method for message-based scalable data transport may operate, according to an embodiment of the invention. As illustrated in that figure, in embodiments a set of data sources 102 may communicate with each other and with remote resources via network 104. In embodiments, the set of data sources 102 may include, for instance, individual servers, clients or other nodes or assets having hard disk, magnetic tape, optical or other storage media. Network 104 may in embodiments be or include a local area network (LAN) such as an Ethernet network, a wide area network (WAN), or other network type or topology. Network 104 may in further embodiments be or include a dedicated network for purposes of data backup, a shared network utilized periodically to effect data transport, the Internet, or other networks or facilities. However, in general one or more of the data sources in the set of data sources 102 may have a requirement to backup data in whole or part, on a periodic or other basis and in comparatively large amounts.

As illustrated, when data backups or other data transfers are generated, in embodiments the data transmitted by one or more of the data sources in the set of data sources 102 may be communicated to a storage server 106, which in turn communicates the data to storage 108. Storage 108 may in embodiments be or include hard disk resources such as RAID banks, optical media such as rewritable CD-ROMs or DVD-ROMs or others, magnetic tape drives, electronic storage capacity such as random access memory, flash memory or other electronic components, or other storage media. In embodiments, storage 108 may likewise be, include or interface to data storage resources such as storage area networks (SANs) or other assets. In embodiments, storage 108 may be equipped to accept and store relatively large-scale amounts of data backup, for instance megabytes, gigabytes, terabytes or more for enterprise and other purposes.

Figure 2:
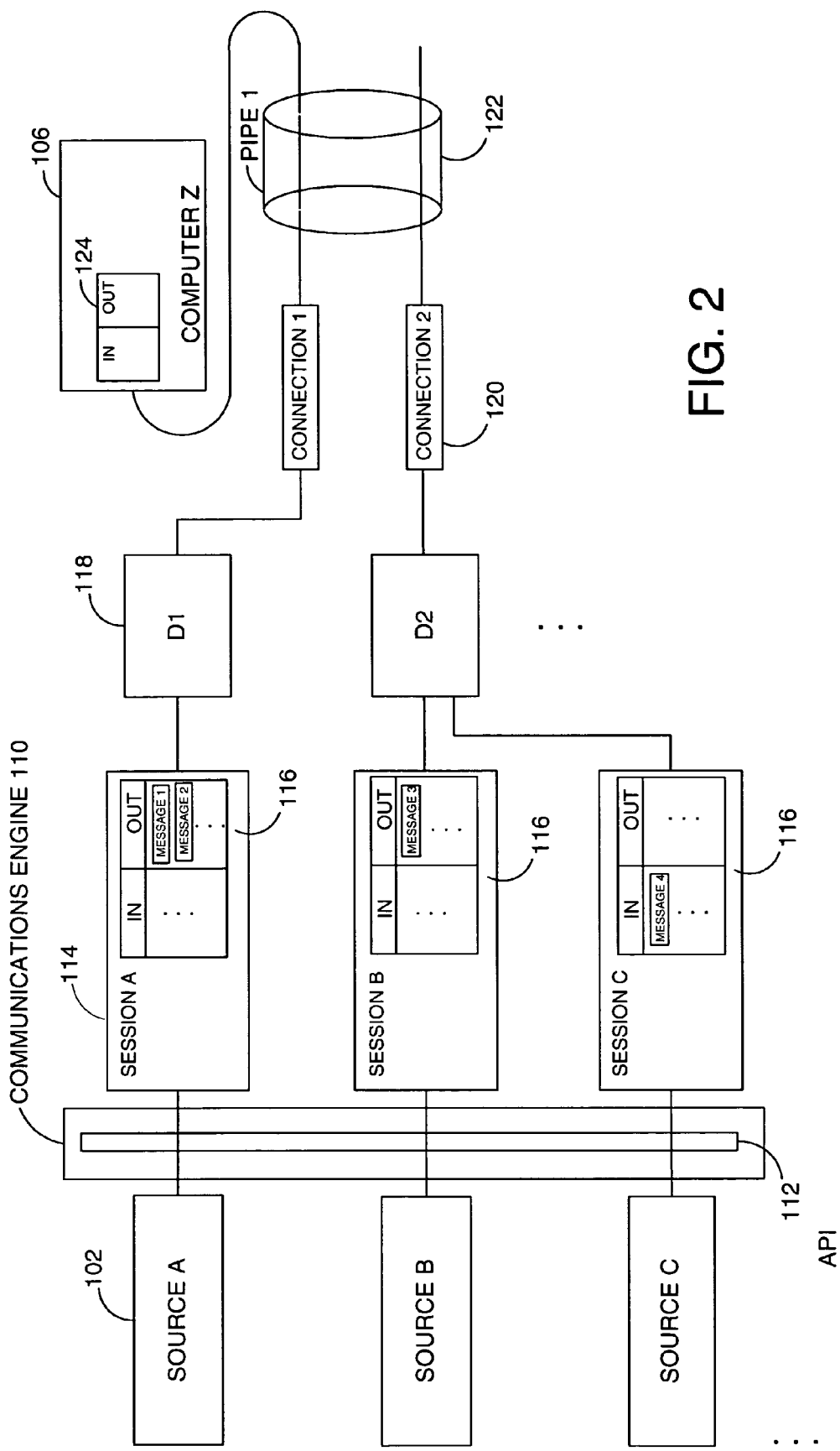
FIG. 2 illustrates an architecture for message-based data transfer, according to an embodiment of the invention.

As illustrated in FIG. 2, according to an embodiments of the invention each of the sources within the set of data sources 102 may communicate with communication engine 110 to initiate, manage and complete a data transport session to data server 106 or other remote or local destination. Communication engine 110 may include or interface to an application programming interface (API) 112 which may expose variables, calls and other interface parameters to the set of data sources 102 to carry out effective data transfer. In the embodiment as shown, each of the data sources in the set of data sources 102 may generate or be associated with a corresponding session within a set of sessions 114. The set of sessions 104 may contain a queue of input/output buffers 116, with one or more input/output buffer being allocated to each session. Other arrangements of sessions, queues, buffers and other resources are possible. An example of illustrative code which may in embodiments instantiate a new session from a session object class follows:

TABLE 1

CSession Object:

```
typedef enum {
        CE_SS_SEND_SYNC,            // NEED to send sync
        CE_SS_APP_CONFIRM_          // NEED to send ACK from
        ACCEPT_ACK,                 app
        CE_SS_APP_CLOSE_            // NEED to send FIN
        SESSION,
        CE_SS_ACTION_
        REQUIRING_STATE,
        CE_SS_NULL,                 // null
        CE_SS_SENDING_SYNC,         // Sending SYNC
        CE_SS_WAITING_ACK,          // Waiting for ACK from
                                    machine Z
        CE_SS_WAITING_FOR_          // Waiting for ACK from
        ACCEPT_ACK,                 app
        CE_SS_SENDING_APP_          // Sending ACK from
        SESSION_ACK,                machine Z TO A
        CE_SS_SESSION_WAITING       // Waiting for WRITE
        FOR_SYNC_COMPLETE,          complete
                                    // after WRITE (SYNC)
        CE_SS_SENDING_FIN,          // Sending FIN
        CE_SS_SESSION_CLOSED,       // Session is CLOSED
        CE_SS_SESSION_READY,        // Session is ready
} CE_SESSION_STATE;
Client Thread:

CSession *pSes = new CSession;
hr=pSes->Init (L"175.1.1.10",       // IP address of backup LAN or just
                                    DNS name
        33701,                      // TCP port
        L"DLS_SERVER_1"             // principal's name
        2*1024*1024,                // Output queue length 2 MB
        4*1024*1024,                // Input queue length 4 MB
        pSesContext,                // points to "GUID_REPLICA"
        dwSesContextLen
        );
hr=pCE->CreateSession (pSes);       // completes immediately, response
                                    on IOCP
```

Other code, languages or modules or different APIs are possible.

As shown, each of the sessions in the set of sessions 114 may in turn communicate with a dispatcher module in the set of dispatcher modules 118. The set of dispatcher modules 118 may themselves secure connections to one or more of a set of connections 120. The set of connections 120 (which may be one or more) may in embodiments use multiple possible underlying communications mechanisms like TCP via Winsock, pipes or others. Each connection in the set of connections 120 aggregated into a logical pipe 122 may communicate with storage server 106, or other remote or local hosts or resources. In embodiments pipe 122 may be established before establishing the set of connections 120 within that structure, but other setup phases and configurations are possible. In embodiments, the invention may support or employ a large number of connections in one or more pipes, for instance on the order of 1000 simultaneous connections, or more or less depending on implementation.

As illustrated, the storage server 106 may contain a destination input/output queue 124, to buffer incoming and outgoing message traffic to the storage server 106 or other ultimate destination. More particularly, at fixed, periodic, selected or other times, one or more of the sources in the set of data sources 102 may initiate a data transfer to the storage server 106 via communication engine 110 and associated resources. The data transfer may be or include, for instance, the backup of a server hard disk or other storage, the capture of large-scale scientific or commercial data, or other data transport tasks. Communication engine 110 may decompose the resident data from the one or more sources in the set of sources 102 into a set of message objects, for more efficient queuing and transfer.

As shown, the session illustrated as Session A in the set of sessions 114 may generate two messages, labeled Message 1 and Message 2, for transfer to storage server 106. Those and other messages may in embodiments be on the order of many megabytes, or larger or smaller, in size. Likewise illustrated Session B has generated a message labeled Message 3 for transport to storage server 106. Session C is illustrated as receiving a message labeled Message 4, on the intake side.

Dispatcher modules in the set of dispatcher modules 118 may bind multiple message streams from the set of input/output buffers 116 to one or more connections in the set of connections 120 and multiplex messages from different sessions into the same pipe of connections. As illustrated, dispatcher module labeled D1 communicates traffic from Session A including Message 1 and Message 2 to Connection 1, while dispatcher module D2 combines the message stream to and from Session B and Session for connection to Connection 2. Other combinations are possible. As shown, communication engine 110 interacting with the set of sessions 114 and the set of dispatchers 118 and other resources may attempt to drive the greatest possible number of pending messages through the set of connections 120 of pipe 122, to achieve the greatest possible utilization of available bandwidth to storage server 106. In embodiments, individual sessions in the set of session 114 may specify different types of network connections, such as ports, sockets or other parameters, for different messages or sets of messages.

Each of the data sources in the set of data sources 102, as well as individual connections in the set of connections 120 and other links in the transport chain to storage server 106, may have different available bandwidths or other transmission characteristics. The queue of input/output buffers 116 in conjunction with the other transmission resources permit buffering action to accommodate the slowest link or links in that chain and varying characteristics of traffic both on sender and receiver side, while driving data transport to the greatest possible utilization. The communication engine 110 may for instance continuously or periodically scan the set of connections 120 to determine whether they are occupied with an outgoing or incoming message stream.

In embodiments those probes or scans may be made using the completion port facility available under the Microsoft Windows™ family of operating systems, according to which the GetQueuedCompletionStatus and other commands may return messages indicating the departure of a given message from queue, or not. Since the communication engine 110, set of dispatchers 118 and other resources may rely upon a message object as the fundamental unit of data transfer, the overall operation of the invention in embodiments may be directed toward fast large-scale transfers, since there is no stop and go effect from the processing of individual pieces of data as in pure TCP transmission modes. Rather, according to the invention a comparatively large-scale message may be generated, entered into queue in the queue of input/output buffers 116, and released for transmission to storage server 106 or other destination.

In embodiments, each session in the set of sessions 114 or communication engine 110 may wait to replenish the queue until the session itself determines that the transmission of the message object is complete. Since the duty to confirm that status resides on the transmitter side, there is no feedback loop from the receiver end, and that type of overhead cost is avoided. The set of sessions 114 may instead wait for confirmation from the queue of input/output buffers 116 that space in queue has opened, to prepare the next message for transmission. The set of sessions 114 thus may not attempt to refill the queue until whole message units are processed. The set of sessions 114 may incorporate a timeout function, to remove a message from the queue of input/output buffers 116 if the corresponding input/output buffer does not confirm the departure of the message to the set of connections 120 within a fixed amount of time, such as 1 minute. The set of sessions 114 may use other timeout or other checking criteria, such as variable delay times, a fixed or variable number of repeat attempts to be made before retiring a message, or others.

Each of the message objects themselves may be communicated via the connections in the set of connections 120 using TCP itself as a lower level protocol. Other protocols are possible. Because the communication engine 110 and its associated message-based protocols govern flow control at a higher level, TCP datagrams may flow without small-scale flow control, error checking or other processing which would tend to slow down large, scalable transfers of the type managed by embodiments of the invention.

In embodiments, the communication engine 110, API 112 and other resources may introduce layers of security protection to protect the data transported to the storage server 106 or other destination. For instance, each session in the set of sessions 114 or connection in the set of connections 120 may be authenticated via digital certificates such as Kerberos, X.509 or other objects, secure socket layers or other mechanisms, before being permitted to be aggregated into pipe 122. Individual messages themselves may likewise be encrypted to deter interception or alteration of the data being moved to storage server 106. Various security, encryption or other techniques, such as Microsoft™ Security Support Provider Interface (SSPI), public key such as RSA standards, private keys such as Digital Encryption System (DES) mechanisms, or others may be employed to protect message content or other aspects of the transmission process. In embodiments, authentication, encryption and related information may be exposed at the level of API 112.

Figure 3:
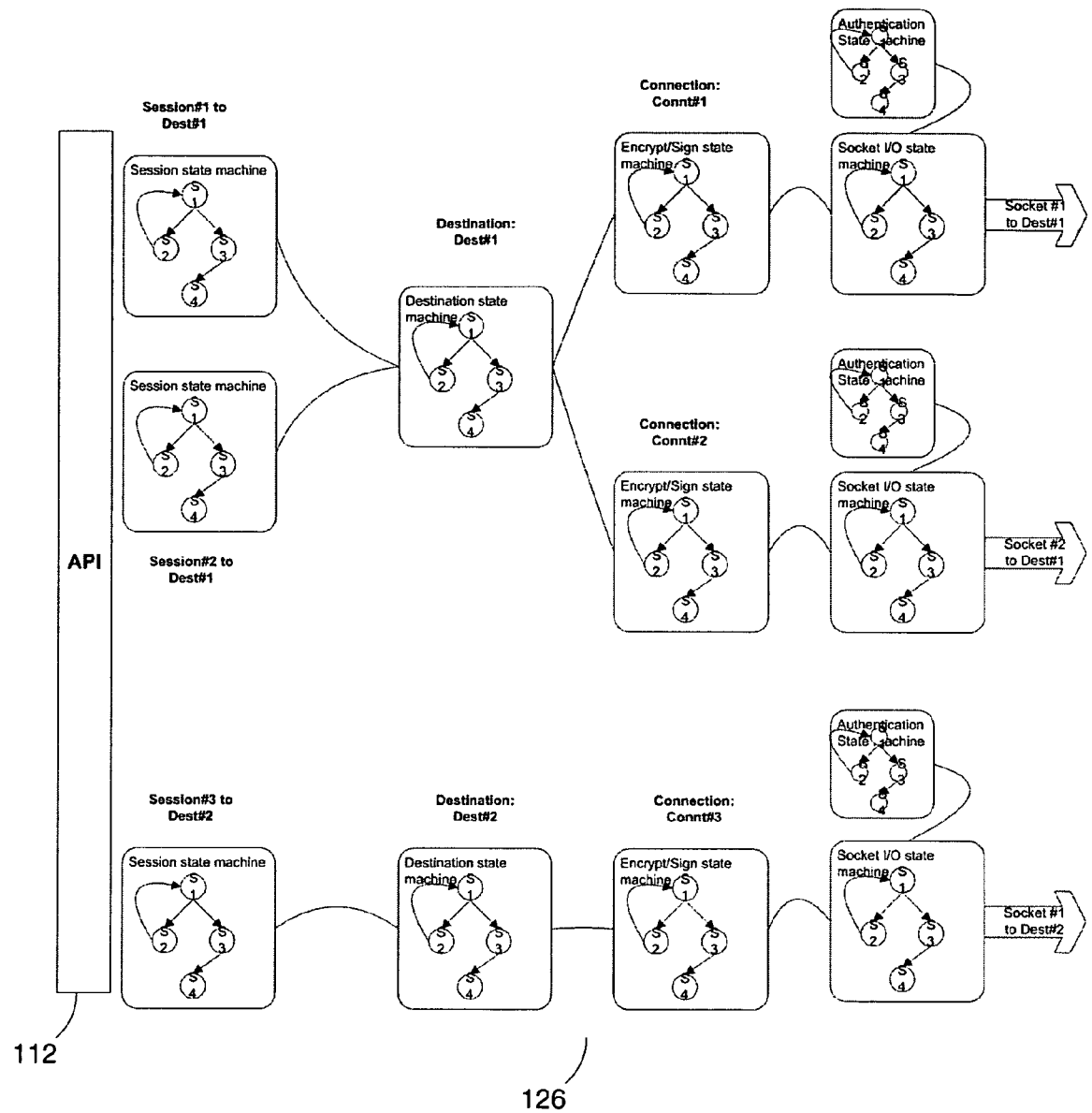
FIG. 3 illustrates a state diagram for message-based data transfer, according to an embodiment of the invention.

FIG. 3 illustrates a set of state machines 126 representing successive states of communications processing, according to an embodiment of the invention. As illustrated in that figure, the API 112 may present an interface to invoke communications resources to effect message-based data transport, such as server backup, large-scale data taking such as scientific or commercial data capture, or other purposes. Delivery of messages via the set of sessions 114 may in embodiments be reliable, in the sense of individual messages either being transmitted in whole, or queued for retransmission. As shown, multiple sessions may be established to multiple destinations, illustratively Session 1 connecting to Destination 1, Session 2 connecting to Destination 1, and Session 3 connecting to Destination 3. As shown, Session 1 and Session 2 may loop between states 1 and 2, awaiting completion of transmission of respective messages to Destination 1 or other triggering events. Communication with Destination 1 may be via a Connection 1 state machine for Session 1, and Connection 2 state machine for Session 2. Each of Connection 1 and Connection 2 may communicate with associated encryption and authentication state machines, to safeguard against unauthorized viewing or alteration of message objects. Each of Connection 1 and Connection 2 may likewise communicate with a respective Socket I/O State Machine which regulates access to respective Socket 1 and Socket 2 connections to Destination 1. Session 3 may communicate with similar state machines processing transmission, encryption, authentication and socket connections to Destination 3. In embodiments, transmission of individual messages may be asynchronous, in that messages may be queued and released according to channel occupancy and other factors, rather than according to timed slots. The creation of individual connections and sessions may likewise in embodiments be asynchronous. Additional state machines and interconnections are possible, and other states are possible for each state machine or process.

Figure 4:
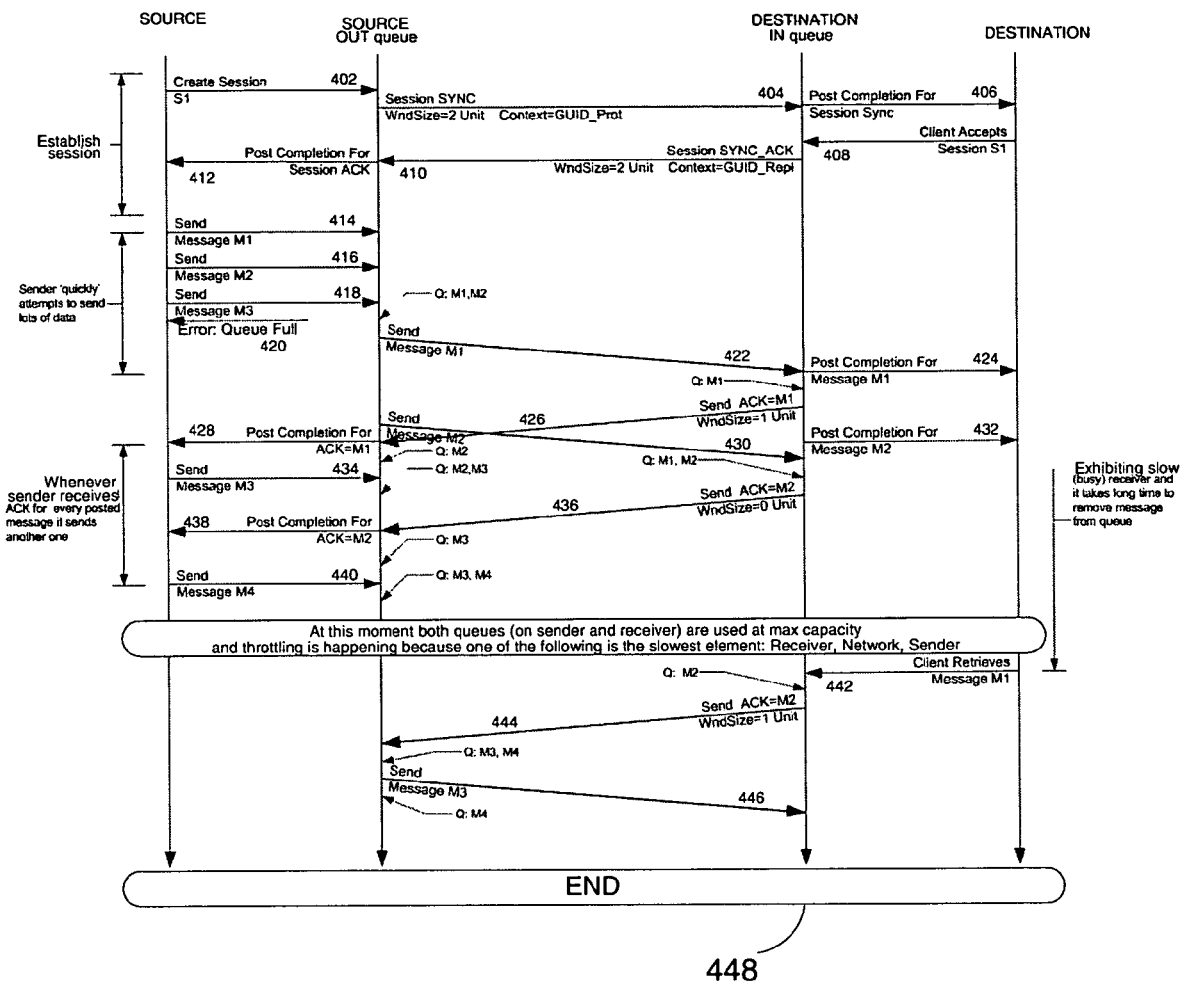
FIG. 4 illustrates a flow diagram of message-based data transfer and associated protocol, according to an embodiment of the invention.

Overall data transport processing is illustrated in FIG. 4. In step 402, one or more sessions in the set of sessions 114 may be generated. In step 404, a session sync message may be transmitted from a data source in the set of data sources 102 and transmitted to the destination input/output buffer 124 of storage server 106. In step 406, a completion message for session sync may be posted to storage server 106. In step 408, the storage server 106 may accept the session request.

In step 410, a session sync acknowledgement message may be transmitted from the destination input/output buffer 124 of storage server 106 to the corresponding input/output buffer in the set of input/output buffers 114 for the requesting data source. In step 412, a completion message for session acknowledgement may be posted to the originating data source in the set of data sources 102. In step 414, the transmitting data source may transmit a first message, denoted Message 1, to its associated input/output buffer in the set of input/output buffers 114. In step 416, the transmitting data source may transmit a second message, denoted Message 2, to its associated input/output buffer in the set of input/output buffers 114. In step 418, the transmitting data source may transmit a third message, denoted Message 3, to its associated input/output buffer in the set of input/output buffers 114. In step 420, the data source may receive an error message indicating that the corresponding input/output buffer is full, so that Message 3 is not accepted into queue. In step 422, Message 1 may be transmitted to the destination input/output buffer 124 of storage server 106. In step 424, a completion message for the transmission of Message 1 may be posted to storage server 106 or other destination. In step 426, an acknowledgement message acknowledging receipt of Message 1 may be transmitted to the input/output buffer of the data source of that message. In step 428, a completion message for Message 1 may be transmitted to the corresponding data source.

In step 430, Message 2 may be transmitted to the destination input/output buffer 120 of storage server 106 or other destination. In step 432, a completion message for Message 2 may be posted to the storage server 106. In step 434, Message 3 may be retransmitted to the input/output buffer corresponding to the data source of that message. In step 436, an acknowledgment message indicating receipt of Message 2 with a window size (WndSize) of zero units may be transmitted to the input/output buffer of the data source for that message. In step 438, a completion message for Message 2 may be posted to that source. In step 440, Message 4 may be transmitted from a data source among the set of data sources 102 to its corresponding input/output buffer among the queue of input/output buffers 116.

In step 442, the client application or other resource to receive Message 1 retrieves Message 1 from the destination input/output buffer 124. In step 444, an acknowledgement message for Message 2 with a window size (WndSize) of 1 unit may be transmitted to the corresponding input/output buffer of the source of that message. In step 446, Message 3 may be transmitted to the destination input/output buffer 124 of storage server 106. In step 448, processing may terminate, repeat, or return to a prior processing point.

The foregoing description of the invention is illustrative, and modifications in configuration and implementation will occur to persons skilled in the art. For instance, while the invention has in embodiments been described in terms of multiple data sources communicating via one communications link to a remote host, in embodiments one or more nodes or sessions may communicate via separate physical or logical links to a remote data host or other destination.

Similarly, while the invention has in embodiments been described as transporting backup data to a single remote host, in embodiments the data may be delivered to separate logical or physical hosts or media. Other hardware, software or other resources described as singular may in embodiments be distributed, and similarly in embodiments resources described as distributed may be combined. The scope of the invention is accordingly intended to be limited only by the following claims.

What is claimed is:

1. A method for initiating the transmission of data, comprising:
   establishing, at a communication engine, a connection from at least one computer data source to a destination;
   generating, at the communication engine, sessions to transmit data via the connection from the at least one computer data source to the destination, wherein generating the sessions comprises invoking an application programming interface and receiving session acceptance from the destination via the application programming interface;
   queuing a set of messages from the sessions for transmission over the connection to the destination from the data source;
   combining, dynamically, messages from at least two separate sessions for the destination having different data sources to generate a combined message stream when the connection has excess bandwidth available to support the combined message stream; and
   transmitting messages from the queued set of messages and the combined messages based upon completion information associated with the queued set of messages stored in a queue at a dispatcher, wherein the completion information comprises results from a completion port operation of at least one of sending or receiving and a window size available at the destination.

2. A method according to claim 1, wherein the step of establishing a connection comprises a step of establishing a connection in a pipe.

3. A method according to claim 1, wherein the step of establishing a connection comprises a step of authenticating at least one of the at least one source and the destination.

4. A method according to claim 3, wherein the step of authenticating comprises a step of authenticating both the at least one source and the destination.

5. A method according to claim 1, wherein the step of queuing a set of messages comprises a step of queuing the set of messages in at least one input/output buffer.

6. A method according to claim 1, further comprising a step of throttling message traffic in the at least one input/output buffer when the completion port is in a full state.

7. A method according to claim 1, wherein the step of transmitting comprises a step of asynchronously transmitting messages from the queued set of messages.

8. A method according to claim 1, wherein the step of transmitting comprises a step of transmitting encrypted messages from the queued set of messages.

9. A method according to claim 1, wherein the step of transmitting comprises a step of transmitting via a transport layer.

10. One or more computer-storage media storing instructions for performing a method to send a transmissible message over a communication network, the method comprising:
    establishing a connection from at least one data source to a destination;
    establishing sessions to transmit data via the connection from the at least one data source to the destination, wherein establishing sessions comprises invoking an application programming interface and receiving a session acceptance from the destination;
    queuing at least one message from the sessions for transmission over the connection to the destination, wherein queuing the at least one message comprises queuing the at least one message in at least one input/output buffer and assigning each message varying time periods that cause the message to expire in the queue if an acknowledgement from the destination is not received within the time period;
    combining, dynamically, messages from at least two separate sessions for the destination having different data sources to generate a combined message stream when the connection has excess bandwidth available to support the combined message stream;
    and
    regulating the communication of the at least one queued message and the combined messages based upon completion information associated with the at least one input/output buffer.

11. The one or more computer-storage media according to claim 10, wherein the step of
    establishing a connection comprises a step of establishing a connection in a pipe.

12. The one or more computer-storage media according to claim 10, wherein the step of establishing a connection comprises a step of authenticating at least one of the at least one source and the destination.

13. The one or more computer-storage media according to claim 12, wherein the step of authenticating comprises a step of authenticating both the at least one source and the destination.

14. The one or more computer-storage media according to claim 10, wherein the message completion information comprises results from a completion port operation of at least one of sending or receiving.

15. The one or more computer-storage media according to claim 10, wherein the at least one message comprises at least one encrypted message.

16. A method for transporting large data sets across a communication network, the method comprising:
- establishing one or more sessions between a plurality of data sources and a storage server by transmitting session requests from output queues at a dispatcher to a destination queue at the storage server and transmitting an acknowledgement that the session requests are accepted from the storage server to the data source;
- buffering data messages received from each data source at an assigned output queue until the assigned output queue is full;
- combining, dynamically, messages from at least two separate sessions for the destination having different data sources to generate a combined message stream when a connection between the data sources and storage server has excess bandwidth available to support the combined message stream;
- transmitting the data messages and the combined messages to the destination queue at the storage server;
- receiving, at the assigned output queue, an acknowledgment receipt of the data messages received from each data source, the acknowledgment receipt comprises a window size available at the destination queue; and
- transmitting additional data messages and additional combined messages from the data sources to the destination queue at the storage server based on the window size included in the acknowledgment receipt.

* * * * *